US012601837B2

(12) United States Patent
Yanai et al.

(10) Patent No.: US 12,601,837 B2
(45) Date of Patent: Apr. 14, 2026

(54) DISTANCE MEASUREMENT DEVICE

(71) Applicant: FUJIFILM Corporation, Tokyo (JP)

(72) Inventors: Yujiro Yanai, Minamiashigara (JP);
Keisuke Kodama, Minamiashigara (JP)

(73) Assignee: FUJIFILM Corporation, Tokyo (JP)

( * ) Notice: Subject to any disclaimer, the term of this
patent is extended or adjusted under 35
U.S.C. 154(b) by 166 days.

(21) Appl. No.: 18/526,196

(22) Filed: Dec. 1, 2023

(65) Prior Publication Data

US 2024/0103165 A1     Mar. 28, 2024

Related U.S. Application Data

(63) Continuation of application No.
PCT/JP2022/021399, filed on May 25, 2022.

(30) Foreign Application Priority Data

Jun. 2, 2021     (JP) ................................. 2021-092822

(51) Int. Cl.
G01S 7/481          (2006.01)
G01S 17/08          (2006.01)
(52) U.S. Cl.
CPC ............ G01S 17/08 (2013.01); G01S 7/4814
(2013.01)
(58) Field of Classification Search
CPC ...... G01S 17/08; G01S 7/4814; G01S 7/4816;
G01S 17/42; G01S 17/931
See application file for complete search history.

(56) References Cited

U.S. PATENT DOCUMENTS 5,093,574 A      3/1992  Pratt et al.
2012/0098935 A1*   4/2012  Schmidt ................ G01S 17/894
348/46

(Continued)

FOREIGN PATENT DOCUMENTS

EP          3 444 635 A1    2/2019
JP          2019-16769 A    1/2019

(Continued)

OTHER PUBLICATIONS

International Preliminary Report on Patentability and Written Opin-
ion of the International Searching Authority for International Appli-
cation No. PCT/JP2022/021399, dated Dec. 14, 2023, with an
English translation.

(Continued)

*Primary Examiner* — Uzma Alam
*Assistant Examiner* — Mamadou Faye
(74) *Attorney, Agent, or Firm* — Birch, Stewart, Kolasch
& Birch, LLP

(57)          ABSTRACT
An object is to provide a distance measurement device
capable of receiving measurement light reflected by an
object by responding to a wide angle range with a high S/N
ratio. The object is achieved by the distance measurement
device including: an infrared light source; a light receiving
section that receives an infrared ray emitted from the light
source and reflected by an object; and a band-pass filter
(BPF) member that is disposed on a light-receiving surface
side of the light receiving section and through which the
infrared ray is transmitted, in which the BPF member
includes a BPF and a refraction member that is disposed in
contact with the BPF and refracts the infrared ray.

6 Claims, 9 Drawing Sheets

(56)                    References Cited

U.S. PATENT DOCUMENTS

| | | | |
|---|---|---|---|
| 2012/0199725 A1* | 8/2012 | Shimotsusa ......... | H10F 39/8067 |
| | | | 250/208.2 |
| 2016/0200161 A1* | 7/2016 | Van Den Bossche . | G01B 11/24 |
| | | | 250/206 |
| 2017/0318239 A1* | 11/2017 | Miyasaka .............. | G02B 5/208 |
| 2019/0250257 A1* | 8/2019 | Finkelstein .......... | H04N 25/773 |
| 2019/0277703 A1* | 9/2019 | Valouch ................ | H10F 77/127 |
| 2021/0354700 A1 | 11/2021 | Nakano | |
| 2022/0066030 A1 | 3/2022 | Taguchi et al. | |

FOREIGN PATENT DOCUMENTS

| | | |
|---|---|---|
| JP | 2020-122689 A | 8/2020 |
| JP | 2021-513087 A | 5/2021 |
| WO | WO 2019/008081 A1 | 1/2019 |
| WO | WO 2020/230698 A1 | 11/2020 |

OTHER PUBLICATIONS

International Search Report for International Application No. PCT/JP2022/021399, dated Jul. 5, 2022, with an English translation.
Japanese Office Action for corresponding Japanese Application No. 2023-525754, dated Nov. 11, 2025, with English translation.

\* cited by examiner

DISTANCE MEASUREMENT DEVICE

CROSS-REFERENCE TO RELATED APPLICATIONS

This application is a Continuation of PCT International Application No. PCT/JP2022/021399 filed on May 25, 2022, which claims priority under 35 U.S.C. § 119(a) to Japanese Patent Application No. 2021-092822 filed on Jun. 2, 2021. The above applications are hereby expressly incorporated by reference, in their entirety, into the present application.

BACKGROUND OF THE INVENTION

1. Field of the Invention

The present invention relates to a distance measurement device that measures a distance to an object by using an infrared ray.

2. Description of the Related Art

A technique called a light detection and ranging (LiDAR) is known, in which measurement light is emitted from a light source, the measurement light reflected by an object is measured by a light-receiving element, and a distance to the object is measured by a time from the light emission of the light source to the light reception by the light-receiving element.

For example, JP2020-122689A discloses an optical device comprising: a deflection unit that deflects illumination light from a light source to scan an object and deflects reflected light from the object; and a branch portion that guides the illumination light from the light source to the deflection unit and guides reflected light from the deflection unit to a light-receiving element, in which the branch portion has a first surface on which the illumination light from the light source is incident, and a second surface including a transmissive region through which the illumination light from the first surface is transmitted and a reflecting region where the reflected light from the deflection unit is reflected, and the illumination light from the first surface is incident into the transmissive region without passing through another surface.

The LiDAR has been considered for use as a distance measurement device (distance-measuring sensor) for realizing autonomous driving of an automobile.

Here, the distance measurement device used for autonomous driving needs to be able to detect an object at a maximum distance of about 200 m. That is, the distance measurement device used for autonomous driving needs to measure measurement light reflected by the object at a maximum distance of about 200 m.

Such measurement light is very weak and has a very low signal to noise ratio (S/N ratio). Accordingly, in the distance measurement device, as disclosed in JP2020-122689A, a band-pass filter is disposed on an incidence side of the light-receiving element. That is, in the distance measurement device, a band-pass filter that transmits only light in a wavelength range corresponding to the measurement light and blocks light in the other wavelength ranges is used to remove light, which causes noise, other than the measurement light to improve the S/N ratio.

SUMMARY OF THE INVENTION

For the autonomous driving, it is necessary to be able to detect an object at various positions and measure a distance.

Here, in a case in which an angle range of light that can be received by the distance measurement device is narrow, it is necessary to mount a large number of the distance measurement devices on one automobile in order to measure a distance to the object in all directions of the automobile.

Therefore, it is preferable that the distance measurement device for the autonomous driving can receive, with the light-receiving element, the measurement light reflected by the object by responding to a wide angle range.

On the other hand, in order to ensure a high S/N ratio, it is necessary to ensure narrow band characteristics of the transmitted light through the band-pass filter.

Incidentally, in many band-pass filters, in a case in which light is incident in an oblique direction, a so-called short-wavelength shift occurs in which a wavelength range of the transmitted light fluctuates to a short wavelength side. Therefore, in a case in which the light-receiving element attempts to receive light from a wide angle range, measurement light (reflected light) incident in the oblique direction is shielded by the band-pass filter due to the short-wavelength shift, which makes it impossible to measure the measurement light (reflected light).

By widening a wavelength range in which light can pass through the band-pass filter, the measurement light can pass through the band-pass filter even in a case in which the measurement light is incident in the oblique direction. However, in this case, light with a wavelength other than the wavelength of the measurement light can also transmit through the band-pass filter, so that the light is measured by the light-receiving element, resulting in a decrease in the S/N ratio.

That is, in the distance measurement device using the band-pass filter to improve the S/N ratio, there is a trade-off relationship between the S/N ratio and the angle range of the light that can be received by the light-receiving element.

Therefore, the advent of a distance measurement device capable of measuring, by a light-receiving element, measurement light reflected by an object by responding to a wide angle range while maintaining a high S/N ratio is desired.

An object of the present invention is to solve such a problem of the related art and to provide a distance measurement device capable of receiving and measuring, by a light-receiving element, measurement light (infrared ray) reflected by an object by responding to a wide angle range while maintaining a high S/N ratio.

In order to solve this problem, the present invention has the following configuration.

[1] A distance measurement device comprising: a light source that emits an infrared ray; a light receiving section that receives the infrared ray emitted from the light source and reflected by an object; and a band-pass filter member that is disposed on a light-receiving surface side of the light receiving section and through which the infrared ray is transmitted, in which the band-pass filter member includes a band-pass filter, and a refraction member that is disposed in contact with the band-pass filter and refracts the infrared ray.

[2] The distance measurement device according to [1], in which, in the band-pass filter member, the band-pass filter and the refraction member are provided in this order from a light receiving section side.

[3] The distance measurement device according to [1] or [2], in which the refraction member is any one of a microlens array, a lenticular lens, a prism sheet, a Fresnel lens, or a meniscus lens.

[4] The distance measurement device according to any one of [1] to [3], further comprising: a condenser lens on a light incident side of the band-pass filter member.

[5] The distance measurement device according to any one of [1] to [4], in which, in a case in which a temperature dependence of a wavelength of emitted light from the light source is x [nm/° C.] and a temperature dependence of a transmission central wavelength of the band-pass filter is y [nm/° C.], $x-0.05 \leq y \leq x+0.05$ is satisfied.

According to the present invention, with the distance measurement device, it is possible to receive and measure, by a light-receiving element, measurement light (infrared ray) reflected by an object by responding to a wide angle range while maintaining a high S/N ratio.

DESCRIPTION OF THE PREFERRED EMBODIMENTS

Hereinafter, a distance measurement device according to an embodiment of the present invention will be described in detail based on suitable examples shown in the accompanying drawings.

The description of the configuration requirements described below may be made based on representative embodiments of the present invention, but the present invention is not limited to the following embodiments.

In addition, all the drawings described below are views conceptually showing the present invention in order to describe the present invention. Therefore, a size, a thickness, a length, an angle, a positional relationship, and the like of each member do not necessarily match the actual ones.

In the present specification, a numerical range represented by "to" means a range including numerical values before and after "to" as a lower limit value and an upper limit value.

An infrared ray (infrared light) generally includes a near-infrared ray, a middle-infrared ray, and a far-infrared ray, but in the present invention, light with a wavelength of 780 to 1700 nm is referred to as an infrared ray. Note that wavelengths other than the above-described wavelength can be used as necessary.

Figure 1:
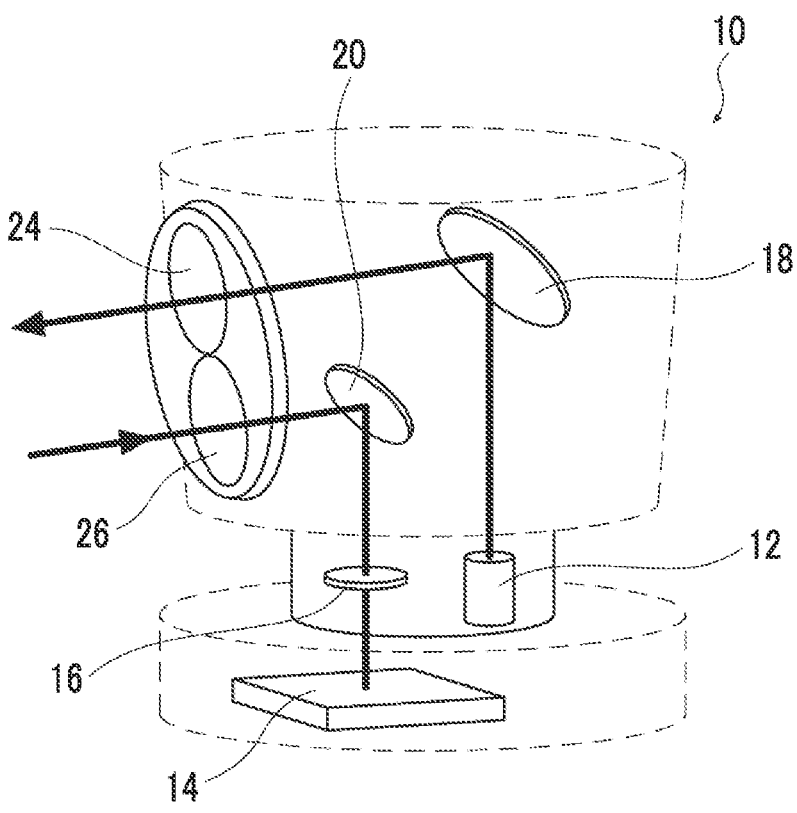
FIG. 1 is a diagram conceptually showing an example of a distance measurement device according to an aspect of the present invention.

FIG. 1 conceptually shows an example of the distance measurement device according to the embodiment of the present invention.

A distance measurement device 10 shown in FIG. 1 is a distance measurement device that measures a distance to an object by the above-described LiDAR, and includes a main body represented by a broken line, and a light source 12, a light-receiving element 14, a band-pass filter member 16, and mirrors 18 and 20 which are disposed inside the main body.

In the distance measurement device 10, the band-pass filter member 16 includes a band-pass filter 30 and a refraction member 32 as described below.

The distance measurement device 10 is basically the same as a distance measurement device using LiDAR in which a band-pass filter is used to improve an S/N ratio, except that the distance measurement device 10 includes such a band-pass filter member 16.

In the distance measurement device 10, the light source 12 emits an infrared ray in a form of, for example, a pulse.

The distance measurement device 10 performs scanning with the infrared ray emitted by the light source 12 in a one-dimensional manner or in a two-dimensional manner, as necessary. The scanning method is not limited, and examples thereof include a method of alternately rotating the main body clockwise and counterclockwise at a predetermined rotation angle, a method using known light deflection means, and a combination of these methods.

The infrared ray emitted by the light source 12 is reflected by the mirror 18, and is emitted from an emission window 24 fixed to the main body to a space where distance measurement of the object is performed.

The infrared ray emitted from the emission window 24 and reflected by the object is incident into the main body from an incidence window 26, is reflected by the mirror 20, is incident into and transmitted through the band-pass filter member 16, and is incident into the light-receiving element 14 for measurement. Here, in a case in which the light incident into the main body is transmitted through the band-pass filter member 16 (band-pass filter 30), light that causes noise other than a predetermined wavelength range corresponding to the infrared ray emitted by the light source 12 is cut, and is incident into the light-receiving element 14.

As a result, with the distance measurement device 10, the infrared ray emitted by the light source 12 and reflected by the object can be measured with a high S/N ratio. In addition, in the distance measurement device 10 according to the embodiment of the present invention, the band-pass filter member 16 includes the refraction member 32, whereby the infrared ray reflected by the object can be measured by the light-receiving element 14 by responding to a wide angle range. This point will be described in detail below.

A measurement result by the light-receiving element 14 is supplied to a data processing unit (not shown).

The data processing unit calculates the distance to the object or a direction in which the object whose distance is measured exists, as with a known distance measurement device. For example, the data processing unit calculates the distance to the object and the like from an emission direction of the infrared ray from the light source 12, an emission timing (emission time point) of the infrared ray by the light source 12, a light-receiving timing (light-receiving time point) of the infrared ray by the light-receiving element 14, and the like.

In the distance measurement device 10 according to the embodiment of the present invention, the light source 12 is not limited, and various known light sources (light emitting elements) used for LiDAR or the like can be used as long as they can emit the infrared ray.

Examples of the light source 12 include a light emitting diode (LED).

The infrared ray emitted by the light source 12 may be diffuse light or parallel light (collimate light), and is usually parallel light.

A wavelength (central wavelength, peak wavelength) of the infrared ray emitted by the light source 12 is not limited, and need only be the above-described wavelength range of the infrared ray. The wavelength of the infrared ray emitted by the light source 12 is preferably 800 to 1650 nm and more preferably 850 to 1600 nm.

In the distance measurement device 10, the light-receiving element 14 receives and measures the infrared ray reflected by the object as described above, and is a light receiving section in the embodiment of the present invention.

The light-receiving element 14 is not limited, and a known light-receiving element (light-receiving sensor) used for LiDAR or the like can be used as long as it can measure the infrared ray.

Examples of the light-receiving element 14 include a charge coupled device (CCD) sensor, a complementary metal oxide semiconductor (CMOS) sensor, a photomultiplier (photomultiplier tube), a photodiode, and an indium gallium arsenide (InGaAs) sensor.

The light-receiving element 14 may be an imaging element (image sensor, area sensor) such as the CCD sensor, or a photodetector element such as a photodiode.

The light-receiving element 14 may include a filter that shields light other than the infrared ray emitted by the light source 12, such as a filter that shields visible light, a filter that shields an unnecessary infrared ray, and a filter that shields visible light and an unnecessary infrared ray, as necessary.

The band-pass filter member 16 is disposed on an optical path of the infrared ray (incidence ray) from the incidence window 26 to the light-receiving element 14. In the following description, the band-pass filter is also referred to as a "BPF".

Figure 2:
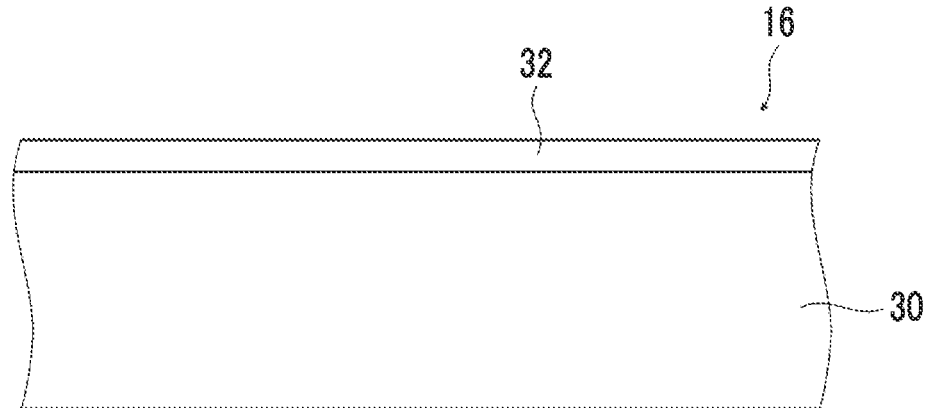
FIG. 2 is a diagram conceptually showing a band-pass filter member.

FIG. 2 conceptually shows an example of the BPF member 16.

The BPF member 16 includes the BPF 30 and the refraction member 32. The refraction member 32 is a member that refracts the infrared ray. In the distance measurement device 10 according to the embodiment of the present invention, the BPF 30 of the BPF member 16 is basically disposed on the light-receiving element 14 side. That is, in the present invention, the infrared ray reflected by the object is incident into the BPF 30 after being refracted by the refraction member 32.

By using the BPF member 16 including the refraction member 32 in addition to the BPF 30, the distance measurement device 10 according to the embodiment of the present invention can measure, with the light-receiving element 14, the infrared ray reflected by the object by responding to a wide angle range while maintains a high S/N ratio due to the inclusion of the BPF 30. This point will be described in detail below.

In the present invention, the BPF 30 is not limited. That is, as the BPF 30, in order to improve the S/N ratio in a distance measurement device for LiDAR or the like, various known BPFs that shield light, which causes noise, other than the infrared ray emitted by the light source 12 and that transmit light in a wavelength range corresponding to the infrared ray emitted by the light source 12 and can be used.

As the BPF 30, a BPF formed of a cholesteric liquid crystal layer in which a cholesteric liquid crystalline phase is immobilized is preferably exemplified. As is well known, the cholesteric liquid crystal layer selectively reflects specific circularly polarized light in a specific wavelength range, and transmits other light.

The BPF formed of the cholesteric liquid crystal layer has a laminate in which two cholesteric liquid crystal layers with different selective reflection wavelength ranges are laminated, and allows light with a wavelength between the selective reflection wavelength ranges of the two cholesteric liquid crystal layers, to pass therethrough.

In the BPF formed of the cholesteric liquid crystal layer, it is preferable to laminate cholesteric liquid crystal layers with different turning directions of circularly polarized light to be selectively reflected in the two cholesteric liquid crystal layers with the different selective reflection wavelength ranges, as necessary. As a result, the BPF 30 can shield both infrared rays of dextrorotatory circularly polarized light and levorotatory circularly polarized light in the wavelength range in the vicinity of the infrared ray emitted by the light source 12.

As described above, as the BPF 30, various known materials other than the BPF formed of the cholesteric liquid crystal layer can be used.

An example thereof is a dielectric multi-layer film in which an organic or inorganic layer of high refractive index and an organic or inorganic layer of low refractive index are alternately laminated.

In the distance measurement device 10 according to the embodiment of the present invention, a width of a transmission wavelength range of the BPF 30 is not limited, and need only be appropriately set according to an S/N ratio required for the distance measurement device 10, an allowable angle range of the infrared ray incident into the light-receiving element 14, a temperature dependence of an oscillation wavelength of the light source 12, and the like.

The transmission wavelength range of the BPF 30 is preferably 70 nm or less, more preferably 67.5 nm or less, and still more preferably 65 nm or less.

It is preferable that the width of the transmission wavelength range of the BPF 30 is set to 70 nm or less from the viewpoint of further improving the S/N ratio.

The BPF member 16 includes the refraction member 32 that refracts the infrared ray, in addition to such a BPF 30. The refraction member 32 refracts the infrared ray that is reflected by the object and is incident into the BPF member 16 in an oblique direction with respect to a normal line of the BPF 30, and makes the infrared ray incident into the BPF 30 in a direction close to the normal line, that is, from the front side.

In addition, in the BPF member 16, the BPF 30 and the refraction member 32 are in contact with each other.

The normal line is a line orthogonal to a plane such as a sheet surface, a layer surface, or a surface of a plate-shaped material, or a tangent of a curved surface. That is, the oblique direction is a direction having an angle with respect to the normal line.

In the following description, the incidence of light in a front direction, that is, in a normal direction is also referred to as "frontal incidence" for convenience. In addition, in the following description, the incidence of light in the oblique direction, that is, in the direction having an angle with respect to the normal line is also referred to as "oblique incidence" for convenience.

By using the BPF member 16 including the refraction member 32 in addition to the BPF 30, the distance measurement device 10 according to the embodiment of the present invention can receive and measure, with the light-receiving element 14, the infrared ray reflected by the object by responding to a wide angle range while maintains a high S/N ratio due to the inclusion of the BPF 30.

As described above, in a distance measurement device for LiDAR or the like that is mounted on an automobile, in order to measure weak measurement light reflected by the object with a high S/N ratio, a BPF that transmits light with a wavelength in the vicinity of the measurement light and shields light with the other wavelengths is used. The narrower the transmission wavelength range of the BPF, the more the S/N ratio can be improved.

On the other hand, it is preferable that the distance measurement device for autonomous driving can perform distance measurement of the object by responding to a range as wide as possible. Therefore, in the distance measurement device, it is necessary to widen an angle range in which the light-receiving element can measure the measurement light reflected by the object.

Incidentally, in many BPFs, in a case in which light is obliquely incident, a so-called short-wavelength shift occurs in which a wavelength range of the transmitted light fluctuates to a short wavelength side. Therefore, even in a case in which the light-receiving element attempts to receive light from a wide angle range, the obliquely incident measurement light is shielded by the BPF, which makes it impossible to measure the measurement light.

In a case in which the transmission wavelength range of the BPF is widened, it is possible to transmit the measurement light incident in the oblique direction. However, in this case, excess light is also transmitted through the BPF and is incident into the light-receiving element for measurement, resulting in a decrease in the S/N ratio.

That is, in the distance measurement device in which the band-pass filter and the light-receiving element are combined, there is a trade-off relationship between the S/N ratio and the angle range of the light that can be received by the light-receiving element.

With respect to this, the distance measurement device 10 according to the embodiment of the present invention uses the BPF member 16 including the BPF 30 and the refraction member 32 to refract, with the refraction member 32, the infrared ray that is reflected by the object and is obliquely incident into the BPF member 16 and then to make the infrared ray incident into the BPF 30. As a result, the infrared ray incident into the BPF member 16 in a direction in which the infrared ray is obliquely incident into the BPF 30 can be refracted by the refraction member 32, and the incidence of the infrared ray into the BPF 30 can be made in a direction close to the frontal incidence, that is, in a direction close to the normal direction of the BPF 30.

Moreover, the BPF 30 and the refraction member 32 are in contact with each other. Therefore, there is no air interface between the BPF 30 and the refraction member 32, and the infrared ray refracted by the refraction member 32 can be incident into the BPF 30 as it is. That is, the BPF 30 and the refraction member 32 are in contact with each other, so that an incidence direction of the infrared ray incident into the BPF member 16 in the oblique direction, into the BPF 30, can be made close to the frontal incidence by maximizing the effect of the inclusion of the refraction member 32.

As a result, with the distance measurement device 10 according to the embodiment of the present invention, even in a case in which the transmission wavelength range of the BPF 30 is narrowed, the infrared ray incident into the BPF member 16 in the direction in which the infrared ray is obliquely incident into the BPF 30 can be transmitted through the BPF 30.

That is, with the distance measurement device 10 according to the embodiment of the present invention, the infrared ray reflected by the object can be measured by the light-receiving element 14 by responding to a wide angle range while maintaining a high S/N ratio.

In the BPF member 16, the refraction member 32 is not limited, and various optical elements that can refract light can be used.

Here, regarding the refraction by the refraction member 32, an angle with respect to a normal line (broken line) of the refraction member is basically determined by the following Snell's law.

$$n_{air} \times \sin(\theta_0) = n \times \sin(\theta_1)$$

$n_{air}$ is a refractive index of air (=1), $\theta_0$ is an incidence angle of light on the refraction member, n is a refractive index of a material for forming the refraction member, and $\theta_1$ is an emission angle (refraction angle).

Here, in order to prevent interfacial reflection, it is preferable that the refraction member 32 and the BPF 30 have a small difference in the refractive index. For example, in a case in which the BPF 30 is formed of the above-described cholesteric liquid crystal layer, the refractive index of the BPF 30 is about 1.5 to 1.7. Accordingly, in this case, it is preferable that the refraction member 32 is formed of a material having a refractive index within a range of 1.5 to 1.7 or a refractive index close to 1.5 to 1.7.

Suitable examples of the refraction member 32 include a microlens array, a lenticular lens, a prism sheet, a Fresnel lens, and a meniscus lens.

Figure 3:
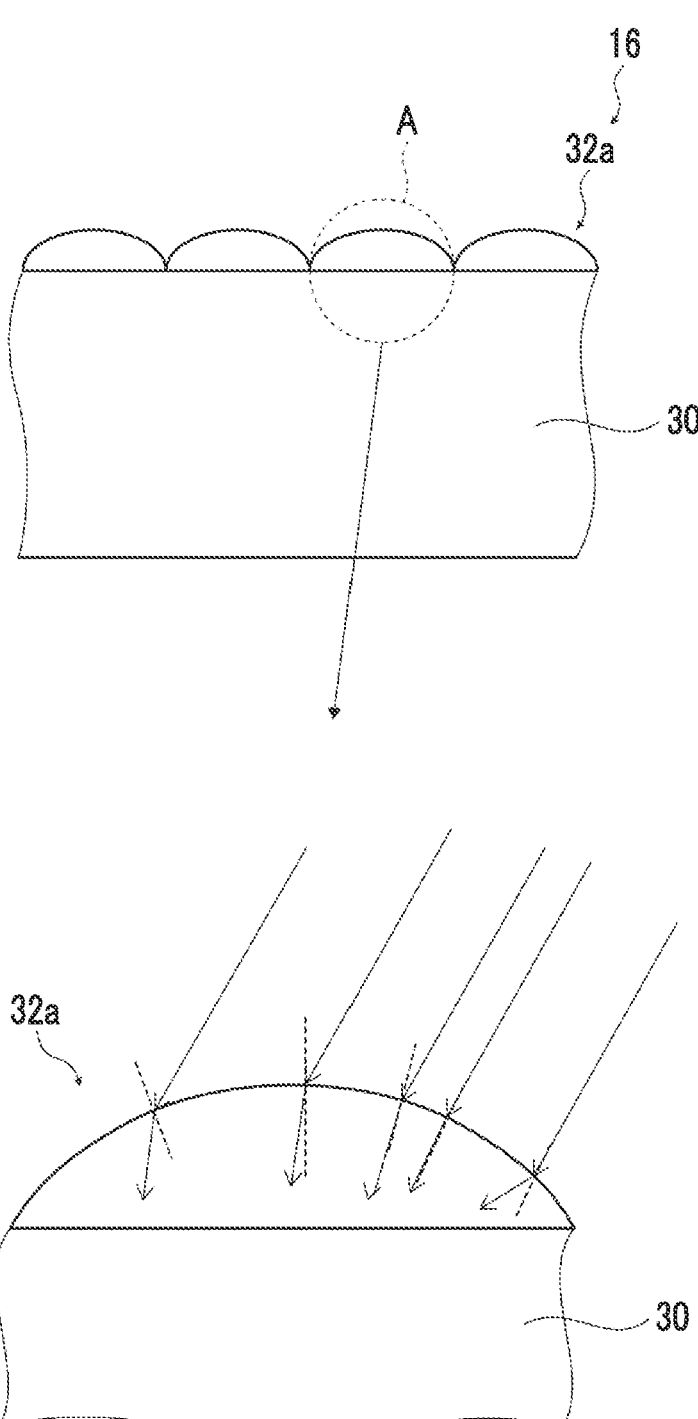
FIG. 3 is a conceptual diagram for describing an example of the band-pass filter member.

FIG. 3 conceptually shows the BPF member 16 using a microlens array as a refraction member 32a. The operation and effect shown below are also the same for a cylindrical lens in a case in which a lenticular lens is used as the refraction member.

As described above, regarding the refraction by the refraction member, an angle with respect to a normal line of the refraction member is basically determined by the following Snell's law. Accordingly, as shown in a partially enlarged view of a region A in FIG. 3, the infrared ray incident into a microlens (spherical crown lens) of the refraction member 32a (microlens array) in the normal direction (broken line) travels in the original direction.

On the other hand, as shown in the partially enlarged view (left side in the figure) of FIG. 3, the infrared ray incident into the microlens of the refraction member 32a in a direction having an angle with respect to the normal line is refracted, so that the incidence direction into the BPF 30 is made close to the normal direction of the BPF 30, that is, the frontal incidence.

As a result, most of the infrared rays incident into the BPF member 16 in the direction in which the infrared ray is obliquely incident into the BPF 30 can be incident into the BPF 30 by making the incidence direction close to the frontal incidence, and a measurement angle range by the light-receiving element 14 can be widened.

Here, as shown on the right side of the partially enlarged view of FIG. 3, depending on the incidence direction of the infrared ray into the microlens, the incidence direction of the infrared ray into the BPF 30 may be more distant from the frontal incidence than the original incidence direction because of refraction by the microlens.

Figure 4:
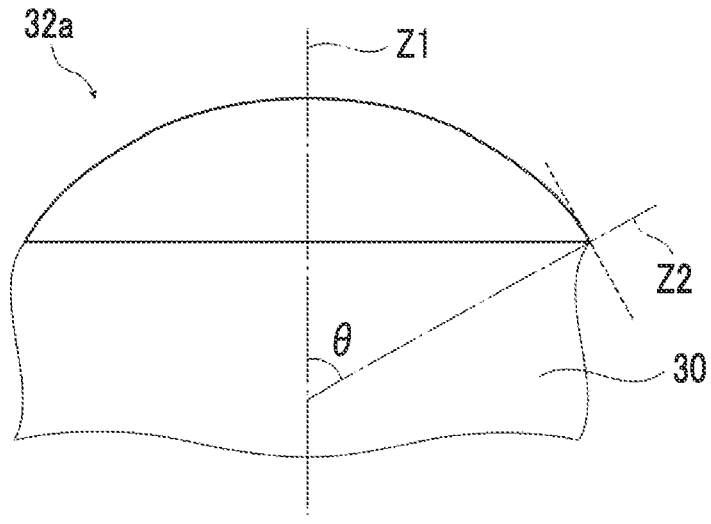
FIG. 4 is a conceptual diagram for describing a preferred configuration of the band-pass filter member shown in FIG. 3.

In order to suppress such inconvenience, it is preferable to fabricate a microlens array serving as the refraction member 32a such that an angle θ formed by a normal line Z1 of the BPF 30 and a normal line Z2 of the microlens is 30° or less in all regions of the microlenses, as conceptually shown in FIG. 4. Further, it is more preferable to fabricate a microlens array serving as the refraction member 32a such that the angle θ formed by the normal line Z1 and the normal line Z2 is 25° or less.

Alternatively, a region in which the angle θ formed by normal line Z1 and the normal line Z2 preferably exceeds 30° and more preferably exceeds 25° may be covered with a light shielding member such as an infrared ray-shielding paint.

With such a configuration, it is possible to suppress that a degree of the oblique incidence of the infrared ray into the BPF 30 with respect to the frontal incidence is greater than the incidence direction into the refraction member 32a by the refraction member 32a (microlens).

As a result, the infrared ray that is obliquely incident into the BPF 30 and shielded can be reduced.

Conversely, the infrared light incident into the refraction member 32a (microlens array) in the direction of the frontal incidence of the infrared light into the BPF 30 may be refracted in a direction having an angle with respect to the frontal incidence and may be incident into the BPF 30 depending on an incidence position into the microlens.

However, even in this case, an angle formed by infrared light refracted by the microlens and incident into the BPF 30 with respect to the frontal incidence (normal direction) is not so large. Therefore, an increase in the infrared light that is incident into the refraction member 32a in the direction of the frontal incidence of the infrared light into the BPF 30 and is shielded by the BPF 30 by refraction by the microlens is very small and substantially does not matter.

In this regard, the same applies to other refraction members described below.

Figure 5:
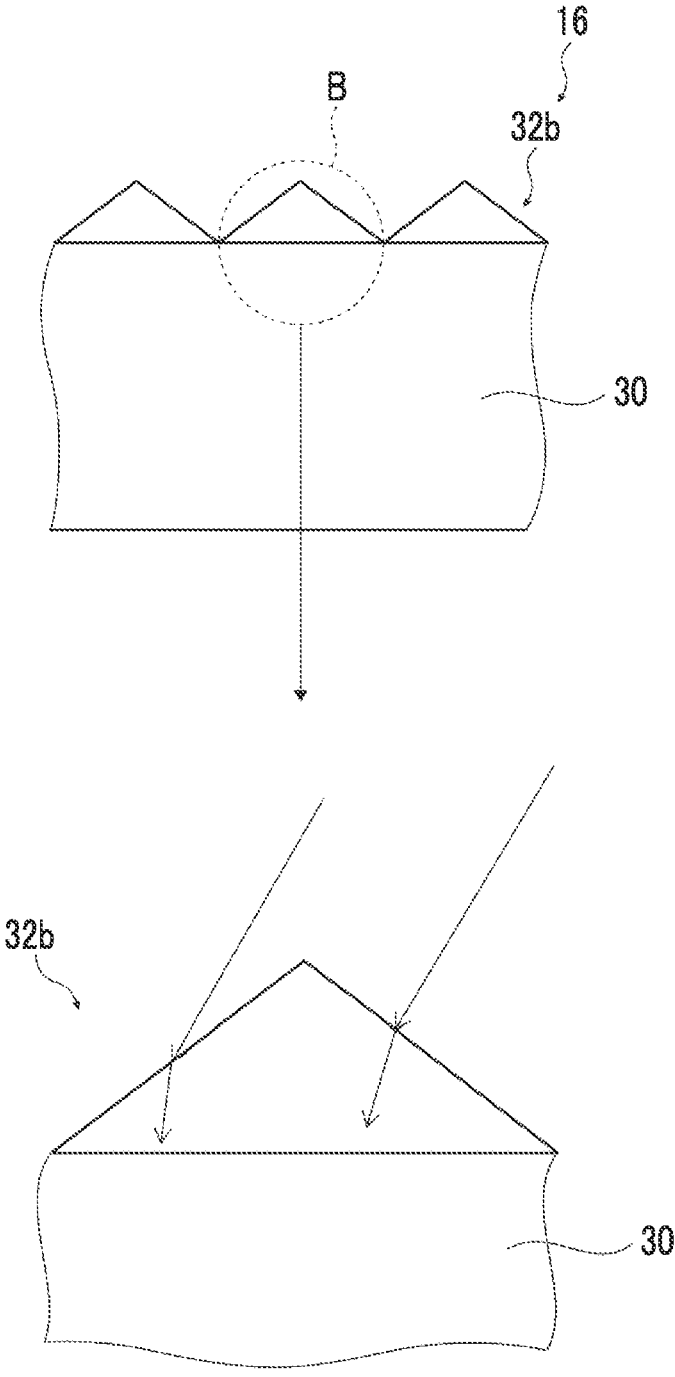
FIG. 5 is a conceptual diagram for describing another example of the band-pass filter member.

A prism sheet can also be used as the refraction member 32 of the BPF member 16. FIG. 5 conceptually shows the BPF member 16 that uses a prism sheet whose prism shape is an isosceles triangle, as a refraction member 32b.

As with the refraction member 32a using the microlens array shown in FIG. 3, the infrared ray incident into the prism of the refraction member 32b (prism sheet) in the normal direction travels in a direction close to the original direction.

On the other hand, as shown in a partially enlarged view of a region B in FIG. 5, the infrared ray incident into the prism of the refraction member 32b in a direction having an angle with respect to the normal line is refracted, so that the incidence direction into the BPF 30 is made close to the frontal incidence.

As a result, as with the refraction member 32a using the microlens array, most of the infrared rays incident into the BPF member 16 in the direction in which the infrared ray is obliquely incident into the BPF 30 can be incident into the BPF 30 by making the incidence direction close to the frontal incidence, and a measurement angle range by the light-receiving element 14 can be widened.

Here, in the refraction member 32b whose prism shape is an isosceles triangle, an angle of the normal line at each position where the infrared ray is incident and an angle formed by the normal line of the BPF 30 are constant.

Therefore, for the same reason as in the example in which a microlens array is used as the refraction member 32a shown in FIG. 3, in the refraction member 32b using the prism sheet, an inclined angle of the prism with respect to a surface of the BPF 30 is preferably 30° or less, and more preferably 25° or less.

In a case in which a prism sheet is used as the refraction member 32 of the BPF member 16, the shape of the prism is not limited to an isosceles triangle as shown in FIG. 5. For example, the BPF member 16 may use, as a refraction member 32c, a prism sheet using a triangular prism with different angles of incident surfaces of the infrared rays as conceptually shown in FIG. 6.

As with the refraction member 32a using the microlens array shown in FIG. 3, the infrared ray incident into the prism of the refraction member 32c in the normal direction travels in a direction close to the original direction.

Figure 6:
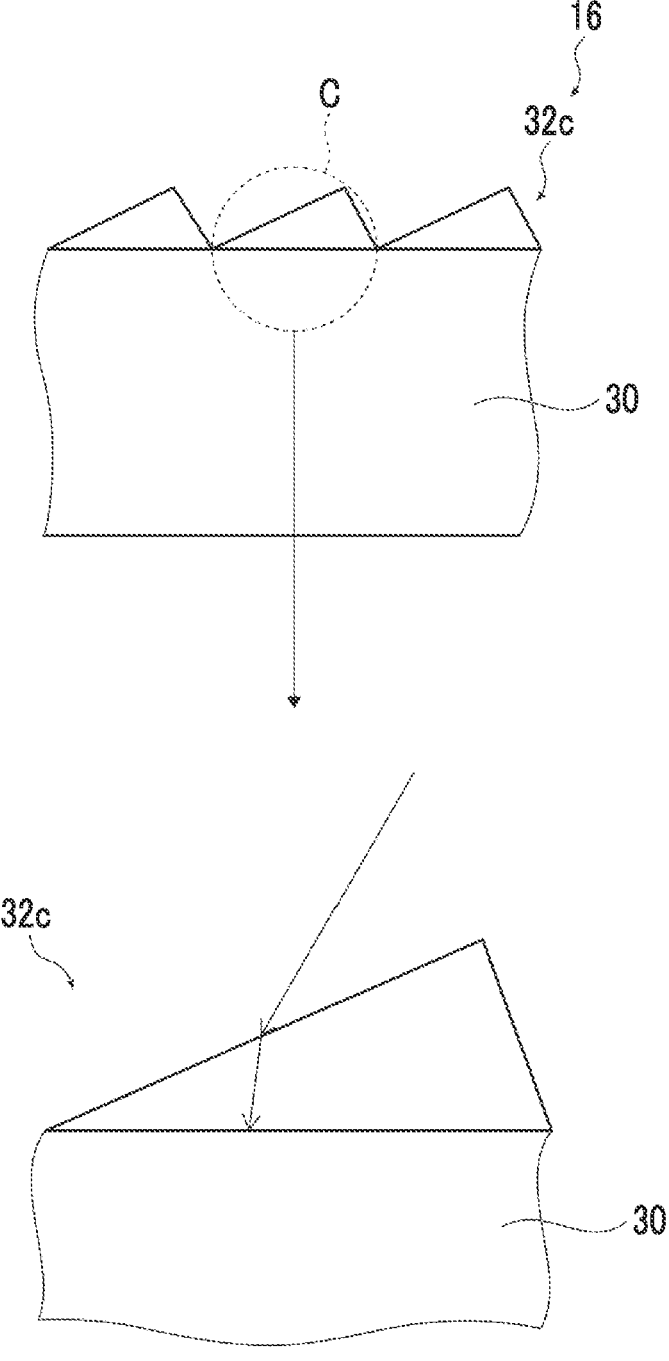
FIG. 6 is a conceptual diagram for describing another example of the band-pass filter member.

On the other hand, as shown in a partially enlarged view of a region C in FIG. 6, the infrared ray incident into the prism of the refraction member 32c in a direction having an angle with respect to the normal line is refracted, so that the incidence direction into the BPF 30 is made close to the frontal incidence.

As a result, as with the refraction member 32a using the microlens array, most of the infrared rays incident into the BPF member 16 in the direction in which the infrared ray is obliquely incident into the BPF 30 can be incident into the BPF 30 by making the incidence direction close to the frontal incidence, and a measurement angle range by the light-receiving element 14 can be widened.

Here, in the refraction member 32c (prism sheet), in inclined surfaces of the prism, the inclination of the normal line of the inclined surface with respect to the normal line of the BPF 30 is different, but, in one inclined surface, an angle of the normal line at each position where infrared ray is incident and an angle formed by the normal line of the BPF 30 are constant.

Therefore, for the same reason as in the refraction member 32a using a microlens array shown in FIG. 3, in the refraction member 32c, an inclined angle of the inclined surface on a side where the angle with respect to the surface of the BPF 30 is small and where an incidence area of the infrared ray is large is preferably 30° or less, and more preferably 25° or less.

Figure 7:
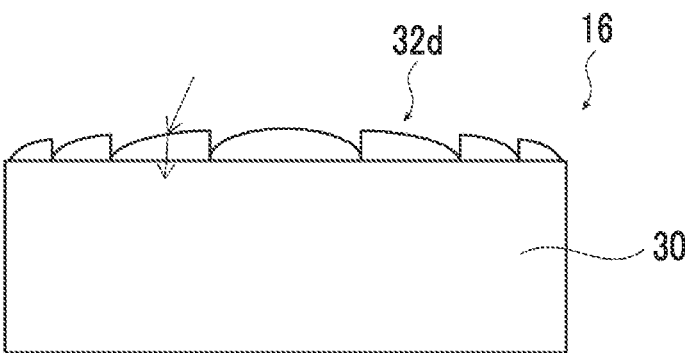
FIG. 7 is a conceptual diagram for describing another example of the band-pass filter member.

As conceptually shown in FIG. 7, a refraction member 32d using a Fresnel lens can also be used as the refraction member 32 of the BPF member 16. As the Fresnel lens, various known objects can be used.

Figure 8:
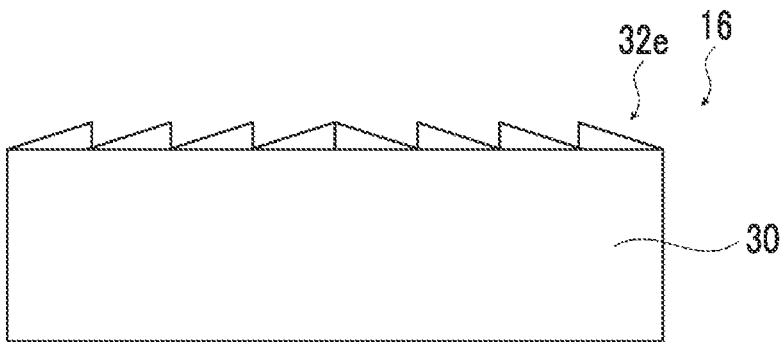
FIG. 8 is a conceptual diagram for describing another example of the band-pass filter member.

Further, as the refraction member of the BPF member 16, as conceptually shown in FIG. 8, refraction members 32e arranged in a concentric manner like a Fresnel lens with an acute angle of a right triangle facing outward can also be suitably used as the refraction member.

Even in this refraction member, as with the refraction member 32a using a microlens array, as indicated by an arrow in FIG. 7, most of the infrared rays incident into the BPF member 16 in the direction in which the infrared ray is obliquely incident into the BPF 30 can be incident into the BPF 30 by making the incidence direction close to the frontal incidence, and a measurement angle range by the light-receiving element 14 can be widened.

A meniscus lens can also be used as the refraction member 32 of the BPF member 16. In the present invention, the meniscus lens is a lens whose both surfaces are curved in the same direction.

In the distance measurement device according to the embodiment of the present invention, degrees of curvature, that is, curvatures of both surfaces of the meniscus lens may be different, but are preferably the same. By using such a meniscus lens, the frontal incidence of the infrared ray into the BPF 30 can be more suitably made, and, as will be described below, the infrared ray can be emitted in the same direction as the incidence direction in the BPF member 16.

Figure 9:
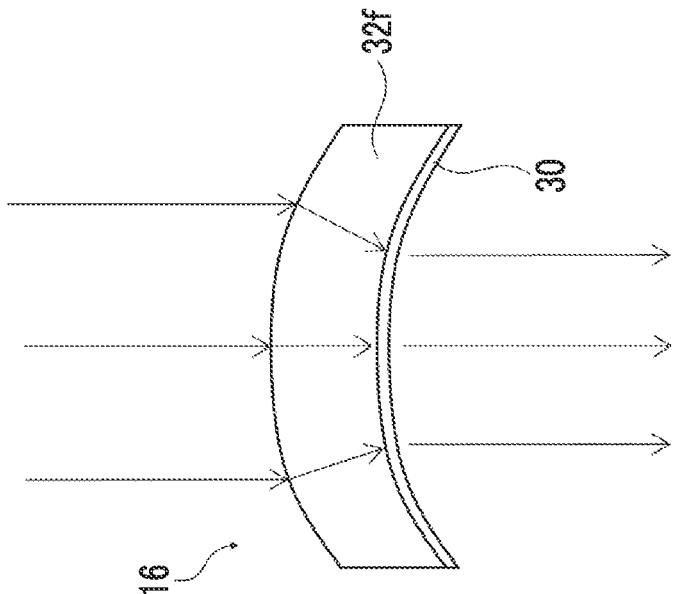
FIG. 9 is a conceptual diagram for describing another example of the band-pass filter member.
Figure 9:
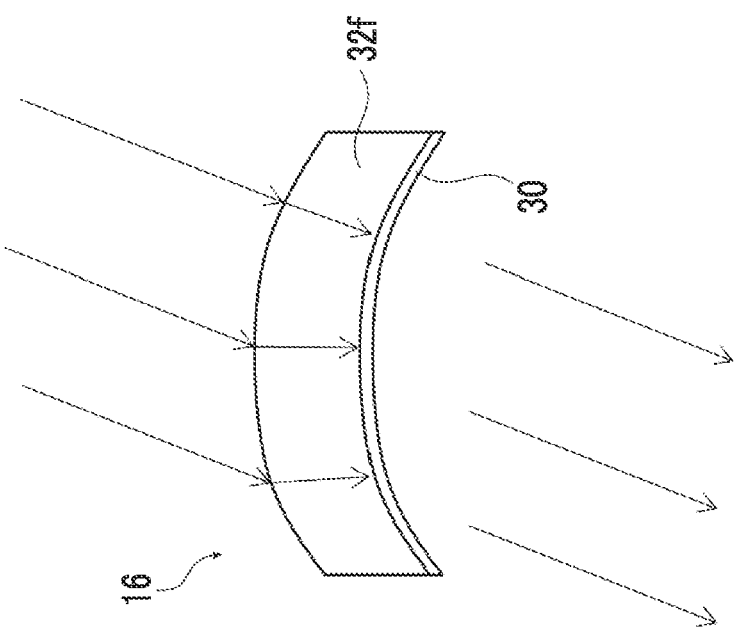

FIG. 9 conceptually shows the BPF member 16 including a refraction member 32f using a meniscus lens.

In a case in which a meniscus lens is used as the refraction member 32f, the BPF 30 is provided on a concave side of the meniscus lens, with a convex side of the meniscus lens being a light incident side on the BPF member 16. In addition, in the BPF member 16 of the distance measurement device according to the embodiment of the present invention, the BPF 30 and the refraction member 32 are in contact with each other. Accordingly, in a case of the refraction member 32f using a meniscus lens, the BPF 30 is in a state of being curved along a curved surface of the meniscus lens.

The left side of FIG. 9 shows an example in which the infrared ray reflected by the object is incident into the refraction member 32f obliquely to an optical axis of the refraction member 32f, that is, the light-receiving element 14.

In this case, the infrared ray incident into the meniscus lens, which is the refraction member 32f, shown on the right side of the figure in the frontal incidence, that is, in the normal direction, travels in the original direction as in the refraction member 32a using a microlens array shown in FIG. 3. In the example shown in FIG. 9, as a preferable aspect, the meniscus lens, which is the refraction member 32f, has the same curvature on both surfaces. In addition, as described above, the BPF 30 is curved with the same curvature as the refraction member 32f Accordingly, the infrared ray transmitted through the refraction member 32f is incident into the BPF 30 in the normal direction, that is, is frontally incident into the BPF 30.

On the other hand, the infrared rays obliquely incident into the refraction member 32f shown in the center and the left side in the figure are refracted by the refraction member 32f so as to restore traveling in the oblique direction. As a result, the infrared rays are incident into the BPF 30 that is curved at angles close to the frontal incidence.

In addition, the infrared rays incident with an angle with respect to the frontal incidence are transmitted through the curved BPF 30 and then refracted by a difference in refractive index with air according to the Snell's law described above. As a result, the traveling direction of the light after being transmitted through the BPF 30 is substantially the same as the incidence direction on the BPF member 16. In a case in which the BPF 30 is a cholesteric liquid crystal layer, by setting the refractive index to an average value of nx, ny, and nz of the cholesteric liquid crystal layer, the refraction angle generally follows the Snell's law.

On the other hand, as shown on the right side of FIG. 9, in a case in which the infrared ray is incident in the same direction as the optical axis of the meniscus lens, which is the refraction member 32f, that is, the normal line of the light-receiving element 14, the infrared ray frontally incident into the refraction member 32f shown in the center in the figure travels in the original direction and is frontally incident into the BPF 30 as described above.

On the other hand, the infrared rays obliquely incident into the refraction member 32f shown in the right and left sides in the figure are refracted so as to be condensed by the refraction member 32f As a result, the infrared rays are incident into the BPF 30 that is curved at angles close to the frontal incidence.

In addition, as described above, the infrared rays incident with an angle with respect to the frontal incidence are transmitted through the curved BPF 30 and then refracted by a difference in refractive index with air according to the Snell's law described above. As a result, the traveling direction of the light after being transmitted through the BPF 30 is substantially the same as the incidence direction on the BPF member 16.

As a result, even in a case in which a meniscus lens is used as the refraction member 32f, as in a case in which the refraction member 32a using a microlens array is used, most of the infrared rays incident into the BPF member 16 in the oblique direction with respect to the normal line of the BPF 30 can be incident into the BPF 30 by making the incidence direction close to the frontal incidence, and a measurement angle range by the light-receiving element 14 can be widened.

Incidentally, in recent years, reduction in size of the light-receiving element has progressed. It is preferable that the distance measurement device uses a small light-receiving element 14 for reduction in size. Therefore, an area of the light-receiving surface of the light-receiving element 14 may be smaller than a beam diameter of the infrared ray (light beam) reflected by the object.

Figure 10:
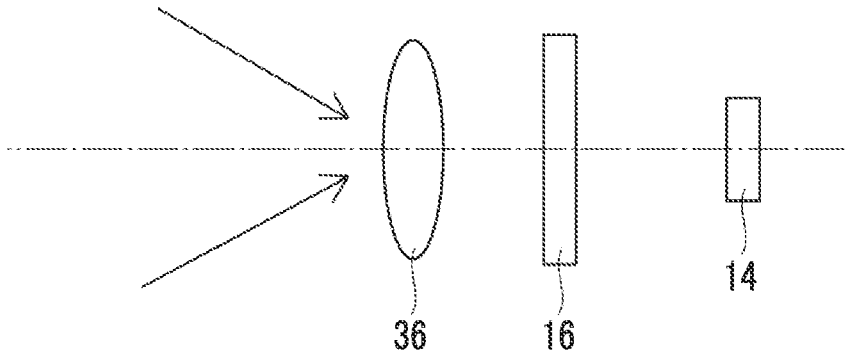
FIG. 10 is a conceptual diagram for describing another example of the distance measurement device according to the aspect of the present invention.

Accordingly, in the distance measurement device 10 according to the embodiment of the present invention, as conceptually shown in FIG. 10, a condenser lens 36 that condenses infrared rays to be incident into the BPF member 16 may be disposed on the light incident side of the BPF member 16.

Further, by providing the condenser lens 36, the effect of the inclusion of the refraction member 32 in the BPF member 16 can be more suitably exhibited, and the infrared ray incident into the BPF member 16 in the direction in which the infrared ray is obliquely incident into the BPF 30 can be incident into the BPF 30 by making the incidence direction close to the frontal incidence more suitably. As a result, the measurement angle range by the light-receiving element 14 can be further widened.

This effect can be suitably obtained in all of the refraction members described above. In particular, in the BPF member 16 having the configuration in which a Fresnel lens is used as the refraction member 32d shown in FIG. 7, the configuration in which the refraction member 32e shown in FIG. 8 is used, and the configuration in which a meniscus lens is used as the refraction member 32f shown in FIG. 9, the effect of the condenser lens 36 can be largely obtained.

Here, in all of the above-described examples, in the BPF member 16, the BPF 30 is located on the light-receiving element 14 side.

Figure 11:
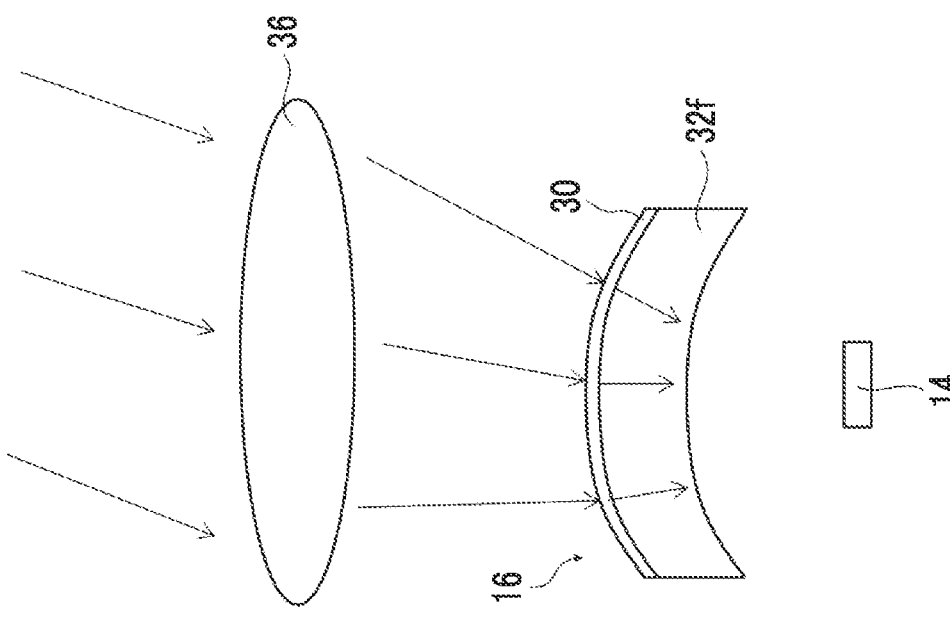
FIG. 11 is a conceptual diagram for describing another example of the band-pass filter member.

On the other hand, in a case in which the distance measurement device includes the condenser lens 36, in the BPF member 16 that uses a meniscus lens as the refraction member 32f, the BPF 30 may be disposed on the infrared ray incident side, and the refraction member 32f may be disposed on the light-receiving element 14 side as conceptually shown in FIG. 11.

As described above, in the BPF member 16 that uses a meniscus lens as the refraction member 32f, the BPF 30 is curved along the curved surface of the refraction member 32f.

The left side of FIG. 11 shows a case in which the infrared rays reflected by the object are incident into the condenser lens 36 obliquely to an optical axis of the condenser lens 36 in the configuration in which the BPF 30 is provided on the infrared ray incident side. In this case, the infrared rays can be incident into the curved BPF 30 at an angle close to the frontal incidence, that is, in a direction close to the normal direction, by being condensed by the condenser lens 36.

The right side of FIG. 11 shows a case in which the infrared rays reflected by the object are incident into the condenser lens 36 in the optical axis direction in the configuration in which the BPF 30 is provided on the infrared ray incident side. In this case as well, the infrared rays can be incident into the curved BPF 30 at an angle close to the frontal incidence, that is, in a direction close to the normal direction, by being condensed by the condenser lens 36.

As a result, similarly, most of the infrared rays incident into the BPF member 16 in the direction in which the infrared ray is obliquely incident into the BPF 30 can be incident into the BPF 30 by making the incidence direction close to the frontal incidence, and a measurement angle range by the light-receiving element 14 can be widened.

The condenser lens 36 is not limited, and known optical members such as various convex lenses can be used as long as it can condense the infrared rays.

As described above, with the distance measurement device 10 according to the embodiment of the present invention which uses the BPF member 16 including the refraction member 32 in addition to the BPF 30, the infrared ray incident into the BPF member 16 in the direction in which the infrared ray is obliquely incident into the BPF 30 can be refracted by the refraction member 32 and can be incident into the BPF 30 by making the incidence direction close to the frontal incidence.

As a result, with the distance measurement device 10 according to the embodiment of the present invention, the transmission wavelength range of the BPF 30 can be sufficiently narrowed to ensure a high S/H ratio, and the angle range of the infrared ray that can be received and measured by the light-receiving element 14 can be widened.

Here, in many cases, the light source 12 (light emitting element) has a temperature dependence in a wavelength of emitted light. In addition, most of the light sources 12 generate heat by emission of the infrared ray (light). Accordingly, in a case in which the distance measurement device 10 is continuously used, the wavelength of the emitted light fluctuates due to the heat generation of the light source.

On the other hand, the BPF 30 also has a temperature dependence in a transmission central wavelength in many cases. Therefore, in a case in which the BPF 30 is heated by the heat generation of the light source 12 or the like, the transmission central wavelength fluctuates due to the heating.

In a case in which the wavelength fluctuation of the infrared ray emitted by the light source 12 occurs, even in a case in which the infrared ray is refracted by the refraction member 32 and is incident into the BPF 30 by making the incidence direction close to the frontal incidence, there is a high possibility that the infrared ray that can be transmitted originally is shielded by the BPF 30 due to the wavelength fluctuation due to a temperature fluctuation. Similarly, in a case in which the fluctuation of the transmission central wavelength of the BPF 30 occurs, even in a case in which the infrared ray is refracted by the refraction member 32 and is incident into the BPF 30 by making the incidence direction close to the frontal incidence, there is a high possibility that the infrared ray that can be transmitted originally is shielded by the BPF 30 due to the wavelength fluctuation due to a temperature fluctuation.

With respect to this, in the distance measurement device 10 according to the embodiment of the present invention, as a preferable aspect, in a case in which the temperature dependence of the wavelength of the emitted light from the light source 12 is x [nm/° C.] and the temperature dependence of the transmission central wavelength of the BPF 30 is y [nm/° C.], Equation "$x-0.05 \leq y \leq x+0.05$" is satisfied.

With such a configuration, the wavelength fluctuation of the infrared ray emitted by the light source 12 due to the heat generation and the fluctuation of the transmission central wavelength of the BPF 30 due to the heating are substantially linked with each other. As a result, even in a case in which the fluctuation of the wavelength of the infrared ray and the transmission central wavelength occurs, the effect of the inclusion of the refraction member 32 in the BPF member 16 can be exhibited to the maximum to suppress the shielding of the infrared ray by the BPF 30 due to a wavelength shift, thereby ensuring a wide measurement angle range by the light-receiving element 14.

The temperature dependence x of the light source 12 and the temperature dependence y of the BPF 30 more preferably satisfy "$x-0.04 \leq y \leq x+0.04$", and still more preferably satisfy "$x-0.03 \leq y \leq x+0.03$".

The distance measurement device according to the embodiment of the present invention has been described above in detail, but the present invention is not limited to the above-described examples, and various improvements and changes may be made without departing from the scope of the present invention.

The present invention can be suitably used for, for example, measuring a distance in autonomous driving of an automobile.

EXPLANATION OF REFERENCES

10: distance measurement device
12: light source
14: light-receiving element
16: band-pass filter (BPF) member
18, 20: mirror
24: emission window
26: incidence window
30: band-pass filter (BPF)
32, 32*a*, 32*b*, 32*c*, 32*d*, 32*e*, 32*f*: refraction member
36: condenser lens

What is claimed is:

1. A distance measurement device comprising:
a light source that emits an infrared ray;
a light receiving section that receives the infrared ray emitted from the light source and reflected by an object; and
a band-pass filter member that is disposed on a light-receiving surface side of the light receiving section and through which the infrared ray is transmitted,
wherein the band-pass filter member includes a band-pass filter, and a refraction member that is disposed in contact with the band-pass filter and refracts the infrared ray, and
the refraction member is any one of a microlens array in which an angle formed by a normal line of the band-pass filter and a normal line of a curved surface of a microlens is 30° or less in all regions of the microlens, a lenticular lens in which an angle formed by a normal line of the band-pass filter and a normal line of a curved surface of a cylindrical lens is 30° or less in all regions of the cylindrical lens, or a prism sheet in which an inclined angle of a prism with respect to a surface of the band-pass filter is 30° or less.

2. The distance measurement device according to claim 1, wherein, in the band-pass filter member, the band-pass filter and the refraction member are provided in this order from a light receiving section side.

3. The distance measurement device according to claim 1, further comprising:

a condenser lens on a light incident side of the band-pass filter member.

4. The distance measurement device according to claim 1, wherein, in a case in which a temperature dependence of a wavelength of emitted light from the light source is x [nm/° C.] and a temperature dependence of a transmission central wavelength of the band-pass filter is y [nm/° C.], $x-0.05 \leq y \leq x+0.05$ is satisfied.

5. The distance measurement device according to claim 1, wherein the band-pass filter is formed of a cholesteric liquid crystal layer in which a cholesteric liquid crystalline phase is immobilized, and a refractive index of the band-pass filter is 1.5 to 1.7.

6. The distance measurement device according to claim 1, wherein the refraction member is any one of the lenticular lens, or the prism sheet.

* * * * *